US011288136B1

(12) United States Patent
Panchanathan et al.

(10) Patent No.: US 11,288,136 B1
(45) Date of Patent: Mar. 29, 2022

(54) CONFIGURING PARAMETERS IN BACKUP ENVIRONMENTS

(71) Applicant: EMC IP Holding Company LLC, Hopkinton, MA (US)

(72) Inventors: Balaji Panchanathan, Bangalore (IN); Pravin Kumar Ashokkumar, Bangalore (IN); Satchidananda Patra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/854,299

(22) Filed: Sep. 15, 2015

(51) Int. Cl.
*G06F 11/14* (2006.01)
*G06F 3/06* (2006.01)

(52) U.S. Cl.
CPC .......... *G06F 11/1469* (2013.01); *G06F 3/065* (2013.01); *G06F 3/0619* (2013.01); *G06F 3/0665* (2013.01); *G06F 3/0689* (2013.01); *G06F 11/1451* (2013.01); *G06F 11/1464* (2013.01); *G06F 2201/80* (2013.01); *G06F 2201/84* (2013.01)

(58) Field of Classification Search
CPC ...... G06F 3/0619; G06F 3/0689; G06F 3/065; G06F 11/1451; G06F 11/1464; G06F 11/1469
See application file for complete search history.

(56) References Cited

U.S. PATENT DOCUMENTS

| | | | | |
|---|---|---|---|---|
| 7,146,387 B1 * | 12/2006 | Russo | ................. | G06F 11/1469 |
| 7,389,311 B1 * | 6/2008 | Crescenti | ............ | G06F 11/1461 |
| 7,664,797 B1 * | 2/2010 | Weisgerber | ......... | G06F 11/1464 |
| | | | | 707/649 |
| 8,140,791 B1 * | 3/2012 | Greene | ............... | G06F 11/1464 |
| | | | | 711/162 |
| 8,285,850 B1 * | 10/2012 | Jones | ..................... | H04L 47/20 |
| | | | | 709/227 |
| 8,849,758 B1 * | 9/2014 | Sivasubramanian | | ........................ |
| | | | | G06F 17/30595 |
| | | | | 707/636 |
| 9,052,952 B1 * | 6/2015 | Chopra | ................. | G06F 9/5005 |
| 9,529,815 B1 * | 12/2016 | Garg | ................... | G06F 16/1734 |
| 2005/0015641 A1 * | 1/2005 | Alur | ................... | G06F 11/1458 |
| | | | | 714/2 |
| 2010/0115068 A1 * | 5/2010 | Gaur | ................... | H04L 41/0813 |
| | | | | 709/221 |
| 2014/0180664 A1 * | 6/2014 | Kochunni | ........... | G06F 11/3442 |
| | | | | 703/21 |
| 2015/0134899 A1 * | 5/2015 | Cudak | ................. | G06F 11/1461 |
| | | | | 711/112 |
| 2015/0249512 A1 * | 9/2015 | Adimatyam | ........... | H04H 20/12 |
| | | | | 725/107 |

* cited by examiner

*Primary Examiner* — Tuan V Thai
*Assistant Examiner* — Alexander J Yoon
(74) *Attorney, Agent, or Firm* — Dergosits & Noah LLP; Todd A. Noah

(57) ABSTRACT

Configuring parameters in backup environments is described. A system outputs, via a user interface, a backup environment question. The system receives, via the user interface, an answer to the backup environment question. The system configures a backup environment parameter based on the answer to the backup environment question and based on information extracted from a corresponding backup environment.

17 Claims, 3 Drawing Sheets

CONFIGURING PARAMETERS IN BACKUP ENVIRONMENTS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

A backup application may output questions for a user of a client device to answer about backing up data on the client device. Such questions may ask the user about various requirements for datasets, networks, security, domains, and extended retention. The backup application may configure the parameters of the backup environment for the client device based on the user's answers to these questions. However, the configuration of these parameters may not be optimal for the process of backing up the client device's data. For example, the user's answers to dataset requirement questions may fail to take into account client device capabilities which enable the faster and more efficient creation of backup files for the client device. In another example, the user's answers to network requirement questions may fail to take into account historical network activity that impacts the transmission of backup files for the client device. In yet another example, the user's multiple answers to multiple security requirement questions may be inconsistent relative to each other, thereby resulting in the configuration of conflicting security parameters that result in the non-optimal backups of the client device.

Embodiments herein configure parameters in backup environments. A backup environment question is output via a user interface. An answer to the backup environment question is received via the user interface. A backup environment parameter is configured based on the answer to the backup environment question and based on information extracted from a corresponding backup environment.

For example, a parameter configurator outputs a dataset requirement question to a user who is registering to backup data on the user's server, and receives a dataset requirements answer from the user. The parameter configurator configures a dataset parameter for multi-channel processing based on the dataset requirement answer from the user and based on the server's multi-processing capabilities which were identified by the parameter configurator, and which remain unknown to the user of the server. Therefore, the parameter configurator overcomes the legacy problem of configuring parameters by extracting information from the backup environment which optimizes the configuration of parameters for the backup process.

Figure 1:
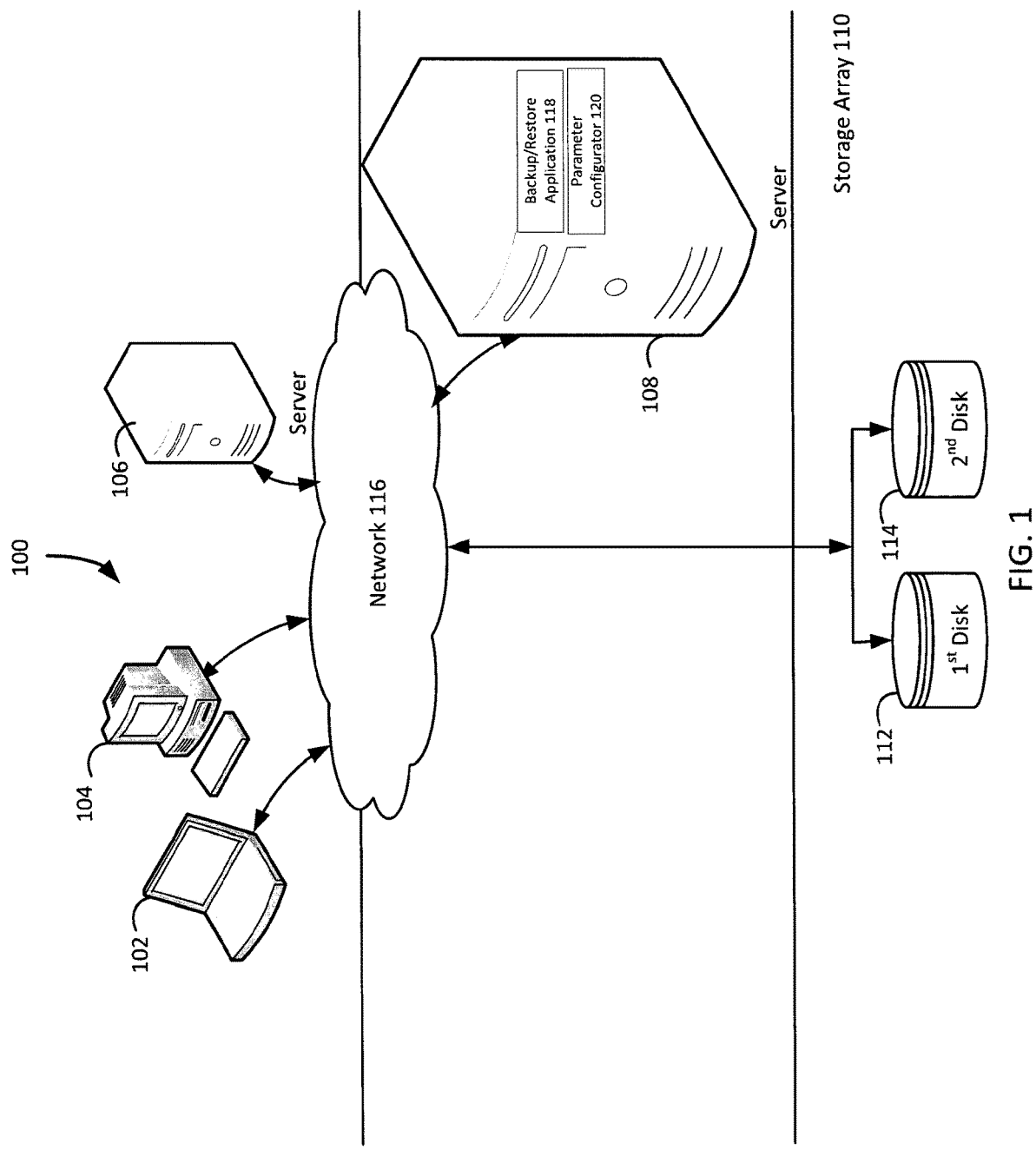
FIG. 1 illustrates a block diagram of an example system for configuring parameters in backup environments, under an embodiment.

FIG. 1 illustrates a diagram of a system that implements configuring parameters in backup environments, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop computer 102, the second client 104 as a personal computer 104, and the third client 106 as a server 106, each of the clients 102-106 may be any type of computer. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 300 depicted in FIG. 3 and described below.

The server 108 includes a backup/restore application 118 that creates backup files of data objects for the clients 102-106, and executes a rollback based on the backup files. The backup/restore application 118 provides centralized administration, such as scheduling, monitoring, and managing backup operations and backup files. The backup/restore application 118 enables the storing of backup operation schedules, client policies, and client configurations. The backup/restore application 118 provides a unique interface to the clients 102-106 during login, and assists the server 108 in authenticating and registering the clients 102-106. The backup/restore application 118 sends backup/restore work orders to the clients 102-106, which receive and process the work orders to start a backup or restore operation. The backup/restore application 118 maintains a local database of all processes that execute on the server 108. The backup/restore application 118 executes server-side processes for a system administrator's graphical management console, which may enable the system administrator to use command line interface tools for queries. For example, a system administrator identifies the clients 102-106 registered with the server 108.

The server 108 includes a parameter configurator 120 that optimizes the configuration of backup parameters based on user answers to backup environment questions and based on information which the parameter configurator 120 extracts from backup environments. The parameter configurator 120 may be a separate component from the backup/restore application 118 or an integrated module within the backup/restore application 118. Although FIG. 1 depicts the backup/restore application 118 and the parameter configurator 120 residing completely on the server 108, the backup/restore application 118 and the parameter configurator 120 may reside in any combination of partially on the server 108 and partially on the clients 102-106. Even though the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker e backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The parameter configurator 120 outputs a backup environment question to a user who is registering to backup data on the user's client device, receives a backup environment answer from the user, and configures a backup environment parameter based on the backup environment answer from the user. The parameter configurator 120 outputs a backup environment question in two scenarios. The first scenario occurs when a single use is registering to backup data on the single user's client device. The second scenario occurs when an enterprise's backup administrator is configuring the backup/restore application 118 for future use by multiple users associated with the enterprise. Optimization parameters which are global may be configured when the backup administrator configures the backup/restore application 118, and parameters which are local to individual users' client devices may be configured when an individual user registers their client device. One example of a global parameter is a security parameter, as each enterprise may have specific security policies and apply these specific security policies to all client devices associated with the enterprise. One example of a local parameter is a network parameter, which different individual users may configure differently based on their differing local networks. The backup environment questions, answers, and parameters may be based on dataset requirements, network requirements, security requirements, domain requirements, and/or extended retention requirements.

Dataset requirements questions request information about what types of plugins and what type of retention policies will be used. Based on the dataset answers, the corresponding groups will be created with datasets assigned, and plugins selected for each dataset. An example of an answer to a dataset question is: "Will have SQL plugin, Oracle plugin, Retention for SQL is 60 days, and Replication is 1 quarter."

An example of configuring dataset parameters based on information extracted from the corresponding backup environment is the parameter configurator 120 configuring a dataset parameter for multi-channel processing based on a dataset requirement answer from the user and based on a server's multi-processing capabilities which were identified by the parameter configurator 120, and which remain unknown to the user of the server 106. Other examples of configuring dataset parameters based on information extracted from the corresponding backup environment include configuring a device deduplication option based on a specific type of server being backed up, and configuring a backup optimization option for a significant number of unchanged files that are backed up on a regular basis. Yet another dataset parameter example is the parameter configurator 120 configuring the files per set parameter for large data files, for which a relatively low number of files per set, such as 1, provides maximum deduplication, and for which a relatively high number of files per set, such as 64, provides better throughput.

An example of configuring network parameters based on information extracted from the corresponding backup environment is the parameter configurator 120 configuring a network backup parameter based on a network requirement answer from the user and based on the corresponding network's historical data that was identified by the parameter configurator 120, and which remain unknown to the user of the server 106. Examples of network parameters are the sslbuffersize parameter and the tcpbuffersize parameter, which vary based on the latency and bandwidth available in the link between a client device and the backup server 108. The bandwidth and the latency are automatically calculated using tools like pingb, which calculates the latency and the throughput available between a client network and a server network. So in the initial configuration the client network address will be collected via user input and based on that, the parameter configurator 120 will measure the throughput/latency and accordingly configure the sslbufsize network parameter and the tcpbufsize network parameter. Other examples of configuring network parameters based on information extracted from the corresponding backup environment include the parameter configurator 120 disabling paging if a network address translator is used, and the parameter configurator 120 configuring layers' buffer sizes based on wide area network information.

An example of configuring security parameters based on a user answer to a backup environment question is the parameter configurator 120 configuring the ciphers for a global storage area network based on a medium authentication answer from the user, configuring the login password complexity based on the same medium authentication answer from the user, and also configuring a parameter for a key manager service based on the same medium authentication answer from the user. The parameter configurator 120 configures multiple security parameters based on a single security answer from the user, thereby avoiding the possibility that conflicting security parameters are configured separately for the cipher, the login password complexity, and the key manager service based on conflicting security answers from the user. The security questions output to the user may also identify the ports that will be required so that the user can check if any of their firewalls will block access, and accordingly enable access to those ports.

An example of configuring domain parameters based on a user answer to a backup environment question is the parameter configurator 120 creating the domains under which the client 106 will register and also configuring the lightweight directory access protocol parameters based on the answer to the lightweight directory access protocol question for domain requirements from the user.

An example of configuring extended retention parameters based on a user answer to a backup environment question is the parameter configurator 120 configuring an export policy parameter, an export frequency parameter, a backup types parameter for export, an export browsing parameter, or a proxy server setup parameter. The export policy parameter identifies the media which stores the export. The export frequency parameter identifies when exports occur, such as based on regular intervals, specific weekdays, a specific day of each month, or on demand. The backup types parameter for export identify which types of files are exported, such as daily, weekly, monthly and yearly. The export browsing parameter identifies a client for an export, and a backup export range. The proxy server setup parameter identifies a proxy server for virtual machine backups.

After the parameter configurator 120 configures backup environment parameters, the parameter configurator 120 may analyze a backup process once backups begin, output a recommended reconfigurations of a backup environment parameter based on the analysis, explain the reason behind the recommended reconfiguration of the backup environment parameter to a user, and reconfigure any backup environment parameters approved for reconfiguration by the user. For example, the parameter configurator 120 records backup failures, determines that some of the failures are due to cipher mismatches, recommends lowering the cipher strength from high authentication to medium authentication, receives a recommended selection from the user to lower the cipher strength from high authentication to medium authentication, and lowers the cipher strength from high authentication to medium authentication, which reduces backup failures due to cipher mismatches. In another example, the parameter configurator 120 records backup failures, determines that some of the backup failures are due to timeouts which occurred because the number of backup connections in the queue was more than the specified maximum for backup connections, recommends increasing the specified maximum for backup connections, receives a recommended selection from the user to increase the specified maximum for backup connections, and increases the specified maximum for backup connections, which reduces backup failures due to timeouts.

Figure 2:
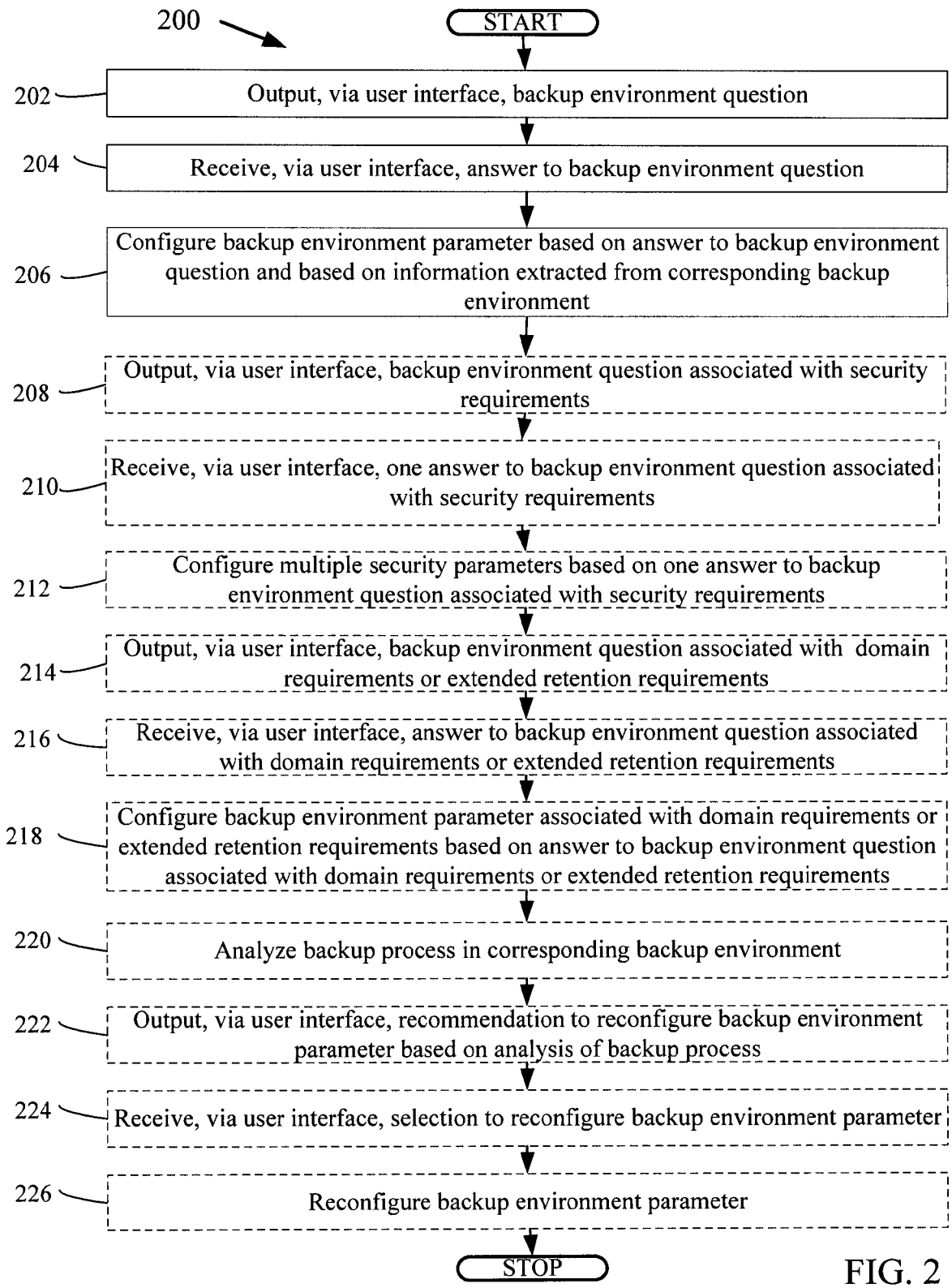
FIG. 2 is a flowchart that illustrates a method of configuring parameters in backup environments, under an embodiment.

FIG. 2 is a flowchart that illustrates a method for configuring parameters in backup environments, under an embodiment. Flowchart 200 illustrates method acts illustrated as flowchart blocks for certain steps involved in and/or between the clients 102-106 and/or the server 108 of FIG. 1.

A backup environment question is output via a user interface, block 202. For example, the parameter configurator 120 outputs a dataset requirement question to a user who is registering to backup data on the user's server 106.

An answer to a backup environment question is received via a user interface, block 204. For example, the parameter configurator 120 receives a dataset requirements answer from the user.

A backup environment parameter is configured based on an answer to a backup environment question and based on information extracted from a corresponding backup environment, block 206. For example, the parameter configurator 120 configures a dataset backup parameter for multi-channel processing based on the dataset requirement answer from the user and based on a server's multi-processing capabilities which were identified by the parameter configurator 120, and which remain unknown to the user of the server 106.

A backup environment question associated with security requirements is output via a user interface, block 208. For example, the parameter configurator 120 outputs a security requirements question to the user, specifying options for high, medium, and low authentication.

One answer to a backup environment question associated with security requirements is received via a user interface, block 210. For example, the parameter configurator 120 receives a selection of the medium authentication option from the user.

Multiple security parameters are configure based on one answer to a backup environment question associated with security requirements, block 212. For example, the parameter configurator 120 configures the ciphers for a global storage area network based on a medium authentication answer from the user, configures the login password complexity based on the same medium authentication answer from the user, and also configures a parameter for a key manager service based on the same medium authentication answer from the user.

A backup environment question associated with domain requirements or extended retention requirements is output via a user interface, block 214. For example, the parameter configurator 120 outputs a lightweight directory access protocol question for domain requirements to the user.

An answer to a backup environment question associated with domain requirements or extended retention requirements is received via a user interface, block 216. For example, the parameter configurator 120 receives an answer to the lightweight directory access protocol question for domain requirements from the user.

A backup environment parameter associated with domain requirements or extended retention requirements is configured based on an answer to a backup environment question associated with domain requirements or extended retention requirements, block 218. For example, the parameter configurator 120 creates the domains under which the client 106 will register and also configures the lightweight directory access protocol parameters based on the answer to the lightweight directory access protocol question for domain requirements from the user.

A backup process is analyzed in a corresponding backup environment, block 220. For example, the parameter configurator 120 records backup failures, and determines that some of the failures are due to cipher mismatches.

A recommendation to reconfigure a backup environment parameter based on analysis of a backup process is output via a user interface, block 222. For example, the parameter configurator 120 recommends lowering the cipher strength from high authentication to medium authentication.

A selection to reconfigure a backup environment parameter is received via a user interface, block 224. For example, the parameter configurator 120 receives a recommended selection from the user to lower the cipher strength from high authentication to medium authentication.

A backup environment parameter is reconfigured, block 226. For example, the parameter configurator 120 lowers the cipher strength from high authentication to medium authentication to avoid backup failures due to cipher mismatches.

Although FIG. 2 depicts the blocks 202-226 occurring in a specific order, the blocks 202-226 may occur in another order. In other implementations, each of the blocks 202-226 may also be executed in combination with other blocks and/or some blocks may be divided into a different set of blocks.

Figure 3:
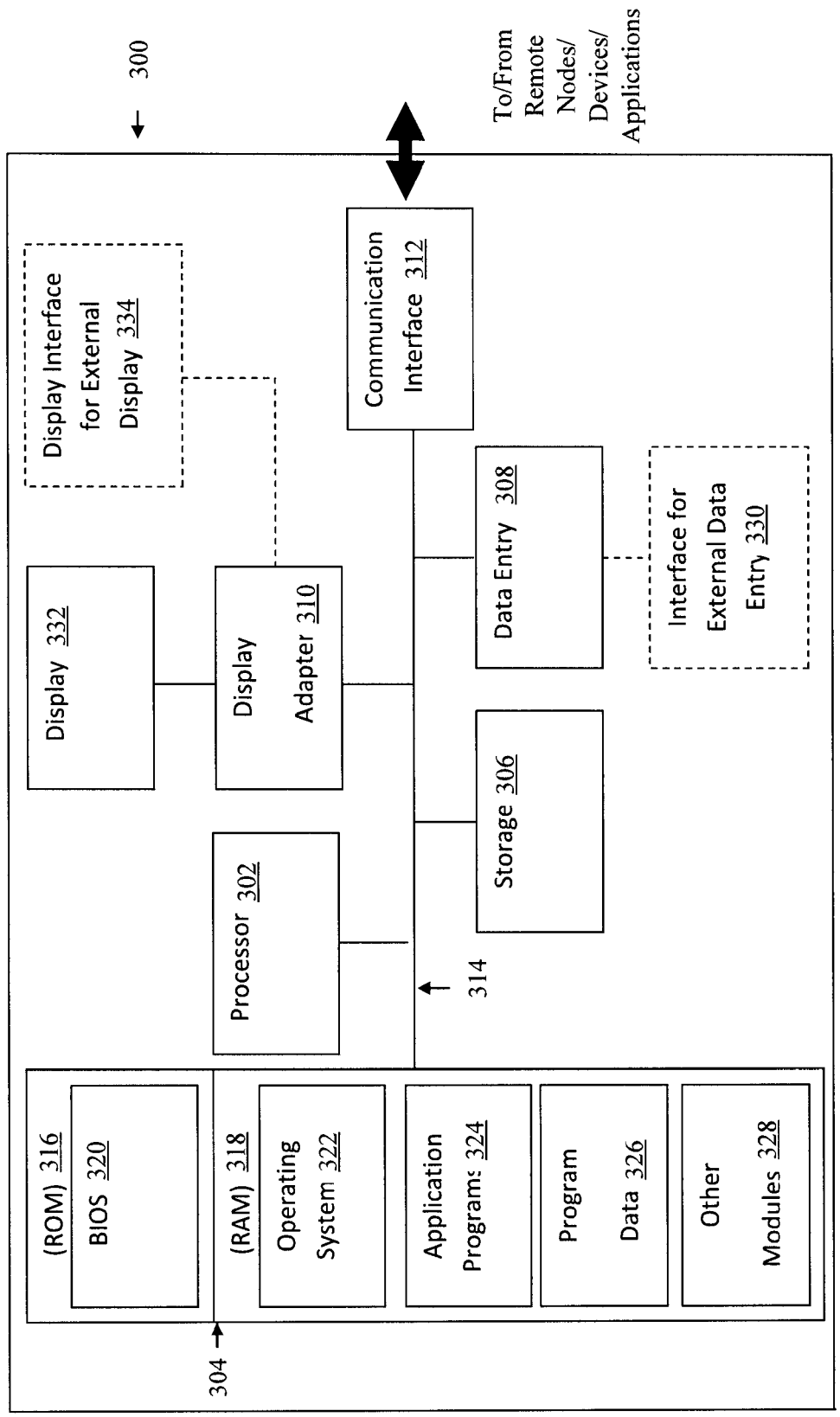
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware.

Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for configuring parameters in backup environments, the system comprising:
a processor-based application stored on a non-transitory computer-readable medium, which when executed on a computer, will cause one or more processors to:
output, via a user interface, a backup environment question to a user of a client device regarding a backup environment parameter during an initial configuration of a backup application, the backup environment parameter being a setting used by the backup application used to implement a function of the backup application;
receive, via the user interface, an answer to the backup environment question device from the user of the client device;
query a corresponding backup environment transparently to the user for information about the corresponding backup environment, the information being related to the backup environment parameter and including at least one of capabilities of the corresponding backup environment or performance of the corresponding backup environment;
extract the information from the corresponding backup environment as part of the initial configuration of the backup application;
configure, automatically as part of the initial configuration of the backup application, a different backup environment parameter based on both the answer to the backup environment question from the user of the client device and the extracted information from the corresponding backup environment, the different backup environment parameter being configured to support the answer to the backup environment question;
analyze a backup process once a backup by the backup application begins in the corresponding backup environment;
output, via the user interface, a recommended reconfiguration of the backup environment parameter based on the analysis of the backup process, the recommended reconfiguration including a recommendation of a different answer to the backup environment question;
receive, via the user interface, a selection of the recommended reconfiguration of the backup environment parameter, the selection changing the answer to the backup environment question to the different answer; and
reconfigure the backup environment parameter based on the recommended reconfiguration.

2. The system of claim 1, wherein the backup environment question is associated with dataset requirements, the backup environment parameter is associated with a dataset parameter, and the information extracted from the corresponding backup environment is associated with dataset information.

3. The system of claim 1, wherein the backup environment question is associated with network requirements, the backup environment parameter is associated with a network parameter and the information extracted from the corresponding backup environment is associated with network information.

4. The system of claim 1, wherein the processor-based application further causes the one or more processors to:
output, via the user interface, a backup environment question associated with security requirements;
receive, via the user interface, one answer to the backup environment question associated with security requirements; and
configure a plurality of security parameters based on the one answer to the backup environment question associated with security requirements.

5. The system of claim 1, wherein the processor-based application further causes the one or more processors to:
output, via a user interface, a backup environment question associated with domain requirements;
receive, via the user interface, an answer to the backup environment question associated with the domain requirements; and
configure a backup environment parameter associated with the domain requirements based on the answer to the backup environment question associated with the domain requirements.

6. The system of claim 1, wherein the processor-based application further causes the one or more processors to:
output, via a user interface, a backup environment question associated with extended retention requirements;
receive, via the user interface, an answer to the backup environment question associated with the extended retention requirements; and
configure a backup environment parameter associated with the extended retention requirements based on the answer to the backup environment question associated with the extended retention requirements.

7. A computer-implemented method for configuring parameters in backup environments, the method comprising: outputting, by a server via a user interface, a backup environment question to a user of the client device regarding a backup environment parameter of a backup application up data on a client device, the backup environment parameter being a setting used by the backup application used to implement a function of the backup application; receiving, by the server via the user interface, an answer to the backup environment question from the user of the client device; querying, by the server, a corresponding backup environment transparently to the user for information about the corresponding backup environment, the information being related to the backup environment parameter and including at least one of capabilities of the corresponding backup environment or performance of the corresponding backup environment; extracting, by the server, the information from the corresponding backup environment as part of the initial configuration of the backup application; configuring, automatically as part of initial configuration of the backup application, a different backup environment parameter based on both the answer to the backup environment question from the user of the client device and the extracted information from the corresponding backup environment, the different backup environment parameter being configured to support the answer to the backup environment question; analyzing, by the server, a backup process once a backup by the backup application begins in the corresponding backup environment; outputting, by the server via the user interface, a recommended reconfiguration of the backup environment parameter based on the analysis of the backup process, the recommended reconfiguration including a recommendation of a different answer to the backup environment question; receiving, by the server via the user interface, a selection of the recommended reconfiguration of the backup environment parameter, the selection changing the answer to the backup environment question to the different answer; and reconfiguring, by the server, the backup environment parameter based on the recommended reconfiguration.

8. The method of claim 7, wherein the backup environment question is associated with dataset requirements, the backup environment parameter is associated with a dataset parameter, and the information extracted from the corresponding backup environment is associated with dataset information.

9. The method of claim 7, wherein the backup environment question is associated with network requirements, the backup environment parameter is associated with a network parameter and the information extracted from the corresponding backup environment is associated with network information.

10. The method of claim 7, wherein the method further comprises:
outputting, via the user interface, a backup environment question associated with security requirements;
receiving, via the user interface, one answer to the backup environment question associated with security requirements; and configuring a plurality of security parameters based on the one answer to the backup environment question associated with security requirements.

11. The method of claim 7, wherein the method further comprises:
outputting, via the user interface, a backup environment question associated with one of domain requirements and extended retention requirements;
receiving, via the user interface, an answer to the backup environment question associated with the one of domain requirements and extended retention requirements; and
configuring a backup environment parameter associated with the one of domain requirements and extended retention requirements based on the answer to the backup environment question associated with the one of domain requirements and extended retention requirements.

12. A computer program product, comprising a non-transitory computer-readable medium having a computer-readable program code embodied therein to be executed by one or more processors, the program code including instructions to: output, via a user interface, a backup environment question to a user of the client device regarding a backup environment parameter of a backup application on a client device, the backup environment parameter being a setting used by the backup application used to implement a function of the backup application; receive, via the user interface, an answer to the backup environment question from the user of the client device; query a corresponding backup environment transparently to the user for information about the corresponding backup environment, the information being related to the backup environment parameter and including at least one of capabilities of the corresponding backup environment or performance of the corresponding backup environment; extract the information from the corresponding backup environment as part of the initial configuration of the backup application; configure, automatically as part of initial configuration of the backup application, a different backup environment parameter based on both the answer to the backup environment question from the user of the client device and the extracted information from the corresponding backup environment, the different backup environment parameter being configured to support the answer to the backup environment question; analyze a backup process once a backup by the backup application begins in the corresponding backup environment; output, via the user interface, a recommended reconfiguration of the backup environment parameter based on the analysis of the backup process, the recommended reconfiguration including a recommendation of a different answer to the backup environment question; receive, via the user interface, a selection of the recommended reconfiguration of the backup environment parameter, the selection changing the answer to the backup environment question to the different answer; and reconfigure the backup environment parameter based on the recommended reconfiguration.

13. The computer program product of claim 12, wherein the backup environment question is associated with dataset requirements, the backup environment parameter is associated with a dataset parameter, and the information extracted from the corresponding backup environment is associated with dataset information.

14. The computer program product of claim 12, wherein the backup environment question is associated with network requirements, the backup environment parameter is associated with a network parameter and the information extracted from the corresponding backup environment is associated with network information.

15. The computer program product of claim 12, wherein the program code includes further instructions to:
output, via the user interface, a backup environment question associated with security requirements;
receive, via the user interface, one answer to the backup environment question associated with security requirements; and
configure a plurality of security parameters based on the one answer to the backup environment question associated with security requirements.

16. The computer program product of claim 12, wherein the program code includes further instructions to:
output, via a user interface, a backup environment question associated with domain requirements;
receive, via the user interface, an answer to the backup environment question associated with the domain requirements; and
configure a backup environment parameter associated with the domain requirements based on the answer to the backup environment question associated with the domain requirements.

17. The computer program product of claim 12, wherein the program code includes further instructions to:
output, via a user interface, a backup environment question associated with extended retention requirements;
receive, via the user interface, an answer to the backup environment question associated with the extended retention requirements; and
configure a backup environment parameter associated with the extended retention requirements based on the answer to the backup environment question associated with the extended retention requirements.

* * * * *